United States Patent
Natali (10) Patent No.: US 10,072,204 B2
(45) Date of Patent: Sep. 11, 2018

(54) SELECTION OF OPTIMAL SURFACTANTS FOR PERFORMING SURFACTANT FLOODING ENHANCED OIL RECOVERY

(71) Applicant: Halliburton Energy Services, Inc., Houston, TX (US)

(72) Inventor: Sanja Natali, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 351 days.

(21) Appl. No.: 14/889,070

(22) PCT Filed: Dec. 31, 2014

(86) PCT No.: PCT/US2014/072953
§ 371 (c)(1),
(2) Date: Nov. 4, 2015

(87) PCT Pub. No.: WO2016/108874
PCT Pub. Date: Jul. 7, 2016

(65) Prior Publication Data
US 2016/0340568 A1  Nov. 24, 2016

(51) Int. Cl.
| | |
|---|---|
| *E21B 49/08* | (2006.01) |
| *C09K 8/584* | (2006.01) |
| *E21B 43/20* | (2006.01) |
| *E21B 43/38* | (2006.01) |
| *E21B 43/26* | (2006.01) |

(52) U.S. Cl.
CPC .............. *C09K 8/584* (2013.01); *E21B 43/20* (2013.01); *E21B 43/38* (2013.01); *E21B 49/08* (2013.01); *E21B 43/26* (2013.01)

(58) Field of Classification Search
CPC .. E21B 49/08; E21B 2049/085; E21B 49/087; E21B 49/088; C09K 8/584; C09K 8/602
See application file for complete search history.

(56) References Cited

U.S. PATENT DOCUMENTS

| | | |
|---|---|---|
| 3,630,953 A | 12/1971 | Whittier et al. |
| 7,033,504 B1 | 4/2006 | Blytas et al. |
| 8,357,639 B2 | 1/2013 | Quintero et al. |
| (Continued) | | |

FOREIGN PATENT DOCUMENTS

WO  2013053036 A1  4/2013

OTHER PUBLICATIONS

International Search Report and Written Opinion for PCT/US2014/072953 dated Sep. 15, 2015.

*Primary Examiner* — Catherine A Loikith
(74) *Attorney, Agent, or Firm* — McDermott Will & Emery LLP (57) ABSTRACT

Methods of providing an optimal surfactant or surfactant blend in a subterranean operation and obtaining a sampled fluid from a subterranean formation and determining constituent parameters of the sampled fluid using a hydrophilic-lipophilic deviation (HLD) model. The HLD model can be used to determine an optimal surfactant or surfactant blend to achieve an oil-water separation morphological phase of the sampled fluid. The optimal surfactant or surfactant blend can then be introduced into the subterranean formation as part of a surfactant flooding enhanced oil recovery operation.

20 Claims, 2 Drawing Sheets

(56) References Cited

U.S. PATENT DOCUMENTS

| | | |
|---|---|---|
| 2008/0108527 A1 | 5/2008 | Varadaraj |
| 2010/0307746 A1* | 12/2010 | Dakin .................... C09K 8/524 |
| | | 166/264 |
| 2013/0096036 A1 | 4/2013 | Quintero et al. |

* cited by examiner

SELECTION OF OPTIMAL SURFACTANTS FOR PERFORMING SURFACTANT FLOODING ENHANCED OIL RECOVERY

BACKGROUND

The present disclosure generally relates to subterranean formation operations and, more particularly, to the selection of optimal surfactants for performing surfactant flooding enhanced oil recovery operations.

Subterranean wells (e.g., hydrocarbon producing wells) are often stimulated by hydraulic fracturing treatments. In traditional hydraulic fracturing treatments, a treatment fluid, which may also function simultaneously or subsequently as a carrier fluid, is pumped into a portion of a subterranean formation (which may also be referred to herein simply as "formation") at a rate and pressure sufficient to break down the formation and create one or more fractures therein. Typically, particulate solids, such as graded sand, are suspended in a portion of the treatment fluid or suspended in a subsequent fluid, and deposited into the fractures. These particulate solids, known as "proppant particulates" (which may also be referred to herein simply as "proppant") gather in a fracture, forming a "proppant pack," that serves to prevent the fractures from fully closing once the hydraulic pressure is removed. Conductive paths through which produced fluids from the formation may flow are formed between the interstitial spaces of the proppant particulates forming the proppant pack.

After a hydraulic fracturing treatment (or other stimulation treatment), oil recovery may commence. Oil recovery is typically separated into three stages: primary oil recovery, secondary oil recovery, and tertiary oil recovery. During primary oil recovery, the natural pressures of the reservoir may be used to push hydrocarbons to the surface, which may allow for about 5-10% of the hydrocarbons in the formation to be recovered. During secondary and tertiary oil recovery, substances, such as water, gas, or other fluids or chemicals, may be pushed therein to drive out the remaining hydrocarbons that could not be recovered during primary oil recovery. During any one of these three stages (i.e., the productive life of a formation), an enhanced oil recovery (EOR) technique may be employed to alter the original properties of the oil and increase production. EOR techniques may be used to restore formation pressure, improve oil displacement or fluid flow from the formation, and the like. The primary types of EOR techniques are chemical flooding, miscible displacement, and thermal recovery.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure generally relates to subterranean formation operations and, more particularly, to the selection of optimal surfactants for performing surfactant flooding enhanced oil recovery operations.

Surfactant flooding is an enhanced oil recovery (EOR) technique in which the phase behavior of the oil in a formation (e.g., in a hydrocarbon reservoir) can be manipulated by the use of adding surfactants into a previously stimulated (e.g., hydraulically fractured) subterranean formation (e.g., a wellbore therein). As used herein, the term "subterranean formation," or simply "formation," refers to any material (e.g., rock) under the surface of the earth, encompassing both areas below exposed earth and areas below earth covered by water (e.g., ocean water or fresh water). A "wellbore" may be any opening in a subterranean formation, such as an opening for recovering produced hydrocarbons. Surfactant flooding typically involves adding an amount of a surfactant into an aqueous fluid to sweep a reservoir in a subterranean formation. The presence of the surfactant reduces the interfacial tension between the oil and water phases and also alters the wettability of the reservoir rock to improve oil recovery. The embodiments employing surfactant flooding EOR techniques of the present disclosure may be performed at any stage of oil recovery of a formation including, but not limited to, primary oil recovery, secondary oil recovery, and/or tertiary oil recovery, without departing from the scope of the present disclosure.

Based on the constituent parameters of the hydrocarbon fluid within the formation (e.g., the oil molecule itself, the salinity, the temperature, water content, and the like), a surfactant flooding fluid may be utilized to mobilized trapped oil for production. That is, correctly designed surfactant flooding fluid systems may reduce the interfacial tension and mobilize the hydrocarbons, resulting in improved hydrocarbon recovery. Surfactant flooding is highly dependent on the proper surfactant flooding fluid composition as matched to a particular subterranean formation, as the emulsion formation is dependent on the fluids therein. Moreover, without the properly compatible type and amount of surfactant or surfactant blend, desired properties may not be achieved, and thus the mobilization of the trapped oil in the formation will not be recovered. Current methods of designing surfactant flooding fluids are each specifically designed from scratch through a trial and error basis, with little to no guidance on which surfactant or surfactant blend to begin testing. Given the vast amount of surfactants that are available for testing, then, the design of a proper surfactant flooding fluid may be particularly time consuming and expensive.

The embodiments herein employ the hydrophilic-lipophilic deviation (HLD) model synergistically with the Net-Average Curvature (NAC) model to identify optimal surfactant or surfactant blends for use in a surfactant flooding EOR. The embodiments rely on forming a particular morphological phase with the optimal surfactant or surfactant blend and the hydrocarbons in a formation, so as to achieve an oil-water separation morphological phase, as discussed in greater detail below. In doing so, the tension of the hydrocarbon in the formation is reduced and the hydrocarbons may be mobilized to the surface.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques. As used herein, the term "about" with reference to numerical quantities may mean±5% of a stated numerical value, encompassing any value and subset therebetween.

One or more illustrative embodiments are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

The systems and methods of the present disclosure, as discussed above, utilize the hydrophilic-lipophilic deviation ("HLD") model, in combination with the Net-Average Curvature (NAC) model to select one or more surfactants or surfactant blends for use in performing surfactant flooding enhanced oil recovery operations. As used herein, the term "surfactant blend" refers to use of more than one surfactant type in a composition. The term "surfactant" does not exclude diluted surfactants with water, solvents, or other diluents, which are accounted for in the methods of the present disclosure. The HLD model quantifies the relative impact of the hydrophilic-lipophilic nature of oils (used interchangeably herein with "hydrocarbons") and surfactants on the morphological phase behavior of an emulsion fluid comprising oil, water, and surfactant. The NAC model is also used to predict the phase behavior of emulsions, but accounts for the concentration of surfactant therein. That is, the NAC component of the systems and methods described herein is a scaling model that permits optimization of a selected surfactant or surfactant blend for use in performing surfactant flooding enhanced oil recovery operations.

The systems and methods described herein allow rapid determination of optimal surfactant or surfactant blends to employ in surfactant flooding EOR operations based on specific field requirements. Additionally, the systems and methods described herein permit selection of surfactant or surfactant blends that take into account profitability, environmental impact, availability (e.g., commodity chemicals v, specialty chemicals that are significantly higher in cost), water management, and the like. Correlating the selected optimal surfactant or surfactant blends to field conditions also permits future optimization, which may be achieved after a reduced period of time or with reduced experimentation, and allows adjustments to be made in the field during real-time operations to ensure optimal performance of the surfactant flooding EOR operation. For example, the surfactant or surfactant blends may be adjusted on-the-fly at any point in the EOR operation. As used herein, the term "on-the-fly" refers to performing an operation during a subterranean treatment that does not require stopping normal operations. In combination, these advantages may permit formation of a library of novel surfactant or surfactant blends that can be characterized based on a variety of field parameters including, but not limited to, formation type and location (e.g., environmental regulations in the North Sea), temperature, produced hydrocarbon type, availability of raw materials, and the like.

Accordingly, the systems and methods of the present disclosure may allow customization and optimization of surfactant or surfactant blends with an increased identification time compared to traditional techniques, result in cost savings by reducing costly trial and error composition testing of surfactant or surfactant blends employed by traditional techniques, lower the cost of surfactant flooding EOR operations due to rapid and optimal selection of surfactant or surfactant blends based not only on their surfactant flooding efficacy, but also costs concerns, availability concerns, and the like.

Figure 1:
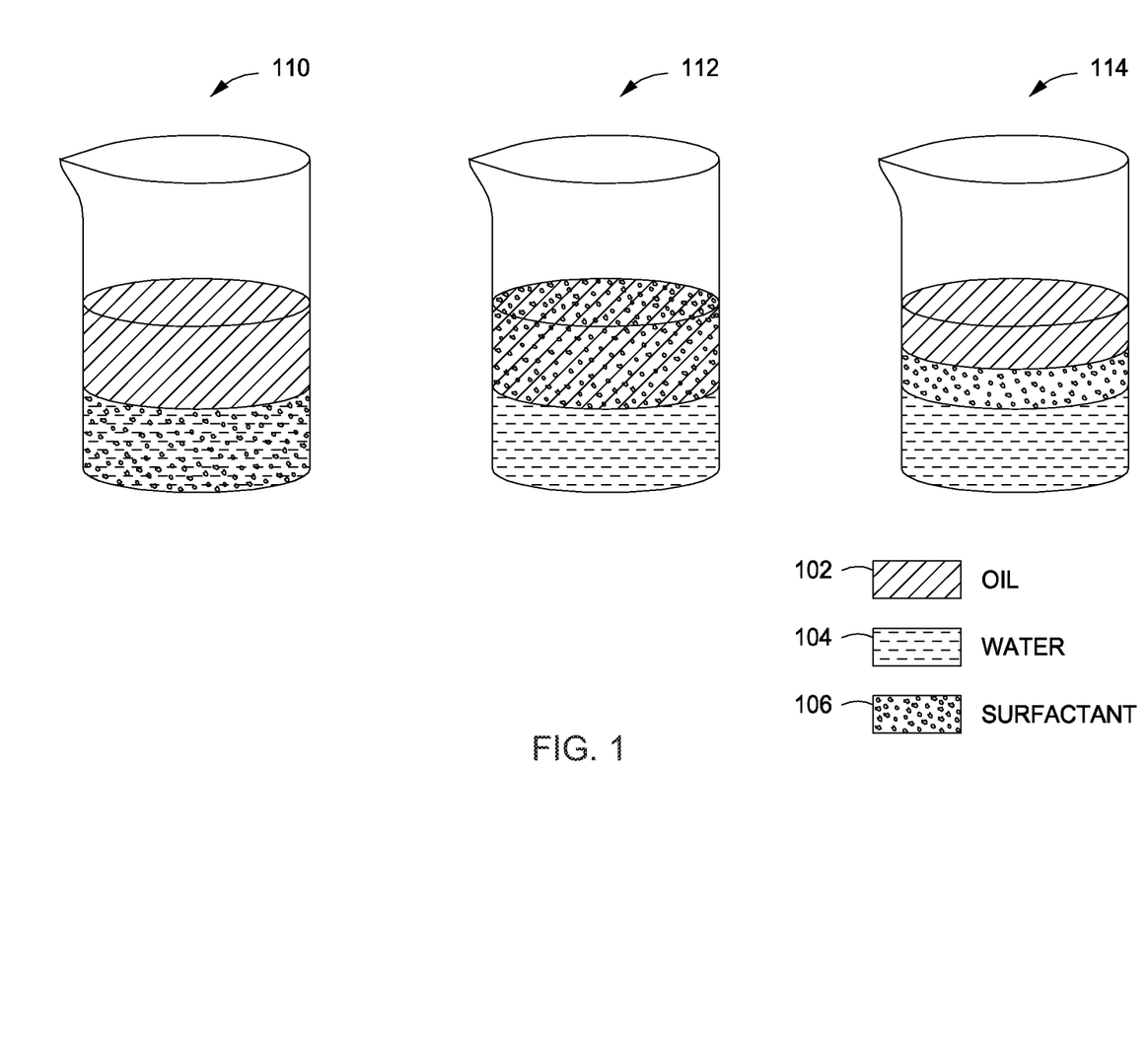
FIG. 1 provides an illustration of the morphological phases of an oil-water system, according to one or more embodiments of the present disclosure.

As shown in FIG. 1, three (3) morphological phases may exist when a surfactant 106 (e.g., a surfactant or surfactant blend) is added to a fluid comprising commingled oil 102 and water 104 (an "oil-water fluid"), each associated with a relative HLD value, discussed in detail below. As used herein, the term "oil-water-surfactant system," (or "O/W/S system"), may be used to describe an oil-water system having a surfactant added therein. The morphological phases include an oil-in-water morphological phase 110, a water-in-oil morphological phase 112, and an oil-water separation morphological phase 114. The oil-in-water morphological phase 110, also referred to as a "Winsor Type I" emulsion (including micro- and nano-emulsions) is characterized by a water 104 and surfactant 106 emulsion, leaving an excess oil 102 phase. The water-in-oil morphological phase 112, also referred to as a "Winsor Type II" emulsion (including micro- and nano-emulsions) is characterized by an oil 102 and surfactant 106 emulsion, leaving an excess water 104 phase. Finally, the oil-water separation morphological phase 114, also referred to as a "Winsor Type III" emulsion (including micro- and nano-emulsions), is characterized by a three-phase separation in which the surfactant 106 is located at the face between the oil 102 and water 104. It will be appreciated by one of skill in the art that some intermixing between the surfactant 106, the oil 102, and the water 104 occurs at each morphological phase type. For example, in the oil-water separation morphological phase, some intermixing between the surfactant 106 and the oil 102 and water 104 may occur at the face therebetween.

Achieving each of the oil-in-water morphological phase 110, the water-in-oil morphological phase 112, and the oil-water separation morphological phase 114 may be dependent on the type of surfactant 106 selected, the type of oil in the oil-water system, the salinity of the water 104 in the oil-water system, the temperature of the in the O/W/S system, and the like, as described in detail below.

In the embodiments herein, the desired morphological phase is the oil-water separation morphological phase 114, which corresponds to the phase that permits a drop in the interfacial tension of a hydrocarbon in a formation, thus leading to mobilization of the hydrocarbon. In order to achieve such a morphological phase by selection of an optimal surfactant or surfactant blend, the contents of the oil (and any water or surfactant content, if present) of the formation must be determined initially. Thereafter, a surfactant or surfactant blend may be designed that is able to form the desired oil-water separation morphological phase 114 with the hydrocarbon in the formation during a surfactant flooding EOR operation. The contents of the formation fluid is determined using the HLD model described herein.

A formation fluid may be initially sampled (e.g., from a bulk hydrocarbon fluid) during production at any stage of the life of a wellbore from a location in a production system and the components of the formation fluid may be determined initially before the type and amount of surfactant or surfactant blend may be determined for achieving the oil-water separation morphological phase, and before using the optimization techniques described herein. As used herein, the term "production system" encompasses the subterranean formation from which the hydrocarbon is extracted, the equipment used in the extraction process, and downstream processing equipment used to transport, store, and process the hydrocarbon. Such equipment encompasses both subsurface and surface equipment (e.g., tubing, pipelines, storage vessels, valves, nozzles, pumps, screens, and the like). As used herein, the formation fluid may be sampled after it is produced through a tubular (e.g., conduit carrying the produced fluid), a storage container, a separate sample tubular (e.g., having a valve and extending from the main tubular with produced fluid), from a formation tester that was located at a downhole location, and the like, without departing from the scope of the present disclosure. It will be appreciated that the formation fluid may be sampled at any location in the production system, without departing from the scope of the present disclosure, provided that the formation fluid is not contaminated with non-wellbore fluids or substances that are unknown.

The formation fluid is expected to comprise primarily hydrocarbon, with at least a portion of water, or vise versa. Accordingly, the formation fluid will simply be referred to as hydrocarbon fluid herein. It is expected that the hydrocarbon fluid may additionally comprise other additives, such as surfactants. When such additives are important to the determination of the desired morphological phase, they will be accounted for in the HLD model described herein.

The components of the hydrocarbon fluid may be determined using the HLD model, as provided below. The HLD of a hydrocarbon fluid will be explained in terms of an O/W/S system, wherein the hydrocarbon fluid comprises an O/W/S system, which may naturally include oil, water, and a surfactant (which may be natural or included as a result of treatment fluids introduced into a formation during a particular operation), or which may have such constituents added thereto for the purposes of calculating the HLD. An O/W/S system is dependent on the type and amount of surfactant used, which results in a particular morphological phase (FIG. 1).

For ionic surfactants, the HLD may be calculated using Equation 1, below; for nonionic surfactants, the HLD may be calculated using Equation 2, below:

$$HLD = \ln(S) - k^* EACN + c_c - \alpha_T(T - 25° C.) + f(A) \quad \text{Equation 1}$$

$$HLD = b(S) - k^* EACN + c_{cn} - c_T(T - 25° C.) + f(A) \quad \text{Equation 2,}$$

where S is the salinity of the water of the an O/W/S system (g/100 mL water), with log dependency in Equation 1; b is a salinity constant equivalent for nonionic surfactants (unitless); EACN is the equivalent alkane carbon number for the oil of the O/W/S system (unitless), which reflects the oil hydrophobicity based on the number of carbons in the oil or the equivalent number of carbons; T is temperature (° C.) of the O/W/S system at the point where the surfactant is to be added to the oil-water system; $f(A)$ is a function of alcohol (or co-solvent) type and concentration in the O/W/S system (unitless); k is a surfactant constant, which depends on the type of surfactant head group (unitless); $c_c$ is the characteristic curvature (i.e., surfactant hydrophilic-lipophilic nature) for an ionic surfactant (unitless); $c_{cn}$ is the characteristic curvature (i.e., surfactant hydrophilic-lipophilic nature) for a nonionic surfactant (unitless), which reflects the nonionic surfactant hydrophobicity; $\alpha_T$ is a surfactant temperature constant for ionic surfactants (1/° C.), which reflects the ionic surfactant hydrophobicity; and $c_T$ is a surfactant temperature constant for nonionic surfactants (1/° C.). Each of b, k, $\alpha_T$, and $c_T$ are constants of fixed value depending on the particular type of surfactant Accordingly, the HLD model takes into consideration salinity, temperature, alcohol content, and characteristics of the hydrophobicity and type of oil and surfactant (La, "HLD parameters"). In practice applications, produced oil-water systems (La, produced fluid from a subterranean formation comprising oil and water) typically do not include an alcohol content. Accordingly, the method of the present disclosure may use the HLD model based on Equation 3, pertaining to ionic surfactants, and Equation 4, pertaining to nonionic surfactants, below:

$$HLD = \ln(S) - k^* EACN + c_c - \alpha_T(T - 25° C.) \quad \text{Equation 3}$$

$$HLD = b(S) - k^* EACN + c_{cn} - c_T(T - 25° C.) \quad \text{Equation 4.}$$

Based on Equation 3 and Equation 4, as salinity, S, increases, the HLD value also increases. As the EACN value increases the HLD decreases. The surfactant temperature constants may be positive or negative. Accordingly, for example, the ionic surfactant temperature constant may be about 0.01, such that as the temperature, T, increases above the reference value of 25° C., the HLD decreases. On the other hand, for example, the nonionic surfactant temperature constant of an ethoxylate surfactant may be about −0.06, such that as the temperature, T, increases above the reference value of 25° C., the HLD increases. Additionally, as the characteristic curvature of the ionic surfactant, $c_c$, or the nonionic surfactant, $c_{cn}$, increases, the HLD also increases.

The HLD value produced by Equation 3 or Equation 4, depending on the type of surfactant used, predicts the morphological phase of a water-oil system. Referring again to FIG. 1, when the HLD value is equal to zero (0), the oil-water separation morphological phase 114 is achieved and represents separation of the oil 102 and water 104 phases. As the HLD decreases to values less than zero (0), a water-oil system comprising a surfactant will adopt the oil-in-water morphological phase 110; whereas as the HLD increases to values greater than zero (0), the water-oil system comprising a surfactant will adopt the water-in-oil morphological phase 112. Accordingly, although in some embodiments HLD may ideally=0, in other embodiments, the HLD may still be acceptable where the HLD ranges from +/−1, preferably +/−0.5, more preferably +/−0.3, encompassing any value and subset therebetween. By way of example a system of water, SDHS (sodium dihexylsulfosuccinate), and toluene may be considered acceptable if the system achieves an HLD of from −0.2 to 0.3.

In the embodiments herein, the HLD model is used to determine the constituent parameters of a produced hydrocarbon fluid by setting the HLD model to 0. Because the salinity of the produced hydrocarbon may be determined using known analytical techniques, the EACN of the hydrocarbon fluid may be first determined, followed by determination of the remaining constituent parameters. It should be noted, however, that the constituent parameters of the hydrocarbon fluid may be determined by first determining any other parameter in the HLD formula, without departing from the scope of the present disclosure. However, the examples of determining HLD according to the present disclosure, although non-limiting, are provided with reference to first determining an unknown EACN value for a specific type of hydrocarbon fluid ("oil") for illustrative purposes.

The EACN value is specific for each type of oil, and explains the hydrophobicity of the oil. The EACN for alkane oils may be equivalent to the number of carbons atoms in the oil molecule. However, for other oil types, the number of carbon atoms alone may not predict the EACN of the oil, or the oil's hydrophobicity. The EACN of an oil may be determined experimentally where the HLD value=0, representing an oil-water separation morphological phase 114 (FIG. 1) by using known values for the remaining variables in either Equation 1 or Equation 2. The temperature variable, T, may be controlled at temperature 25° C., such that the variable is effectively no longer taken into account in determining the EACN value. Similarly, the salinity, S, may be effectively removed as a variable for determining HLD by using a known salinity and measuring the salinity using known techniques (e.g., a conductivity meter, a refractometer, a hydrometer, and the like).

In one instance, the EACN may be determined by using at least two known surfactants having a characteristic curvature and a known salinity based on the relative combination of the known surfactants ("surfactant-surfactant method"). In some instances, use of a two or more of known ionic surfactants in varying concentrations and proportions to one another may cover a wider range of curvature values, which may be preferred to experimentally determining the EACN of a particular O/W/S system. The selected known surfactants should preferably not include surfactants that form complex phases between each other, should preferably be relatively compatible with oil-water systems generally produced from formations, and the like. The characteristic curvature of a mixture of surfactants is determined based on a linear relationship of the added surfactant types, based on Equation 5 for ionic surfactants, and Equation 6 for nonionic surfactants, as follows:

$$C_{c\text{-}mix} = \Sigma_i y_i C_{c_i} \quad \text{Equation 5,}$$

$$C_{cn\text{-}mix} = \Sigma_i y_i C_{cn_i} \quad \text{Equation 6,}$$

where $y_i$ is the fraction of the $i^{th}$ surfactant component (unitless) (e.g., 0.25 if that surfactant component makes up 25% of the surfactant composition); $C_{c_i}$ is the characteristic curvature of the $i^{th}$ ionic surfactant component; and $C_{cn_i}$ is the characteristic curvature of the $i^{th}$ nonionic surfactant component.

In another instance, the EACN may be determined using at least one known surfactant (e.g., known characteristic curvature) and at least one known oil component (e.g., known EACN), to be included in the O/W/S system in addition to the already present oil component ("surfactant-oil method"), each in varying concentrations and proportions to one another. The ratios of the different oils may be adjusted until the HLD value=0, and the EACN of the known and unknown oil mixture is elucidated. Thereafter, the EACN of the unknown oil may be calculated. The EACN value of a mixture of oils is determined based on a linear relationship of the added oil types, based on Equation 7, as follows:

$$EACN_{mix} = \Sigma_i x_i EACN_i \quad \text{Equation 7,}$$

where $x_i$ is the fraction of the $i^{th}$ oil component (e.g., the unknown oil component) (unitless); and $EACN_i$ is the EACN of the $i^{th}$ oil component (e.g., the unknown oil component).

The EACN of an unknown oil in an O/W/S system may additionally be determined using the HLD model described herein using a known surfactant (e.g., known characteristic curvature) and a known range of salinities (e.g., range of salinity concentrations), S, such as by adding a salt to the O/W/S system or by diluting the O/W/S system with water ("salinity method"). Use of an ionic surfactant, in such instances, may permit a greater range of salinities to be evaluated, but it may be necessary to also take into account the salinity of the ionic surfactant itself. In some embodiments, it may be preferred to select a surfactant that can withstand very high salinities to more accurately determine the EACN of the unknown oil.

In each of the above methods, the surfactant-surfactant method, the surfactant-oil method, and the salinity method, a variety of concentrations and/or types of the known constituent parameters may be included in a series of identical O/W/S systems, so as to enhance the ability to accurately determine the EACN of the particular system. That is, an O/W/S/ system may be aliquoted by any means suitable into two or more testing tubes and the parameters are varied until the formation of an oil-water separation morphological phase 114 (FIG. 1) occurs in at least one of the testing tubes, indicating an HLD=0. Moreover, any of these methods and any other methods employed for determining the constituent parameters of a produced hydrocarbon fluid may be automated, without departing from the scope of the present disclosure.

Once the EACN of an unknown oil in an O/W/S system is known, other unknown parameters may be calculated based on the know parameters and known EACN, thereby enabling determination of the surfactant characteristics detailed in the HLD model for achieving a desired HLD value substantially equal to 0, having the oil-water separation morphological phase desired for surfactant flooding EOR operations. Accordingly, with the known surfactant qualities required, a surfactant or surfactant blend and dosage thereof may be selected to achieve the desired HLD value and morphological phase, of the oil-water system originally tested (i.e., the produced hydrocarbon fluid). As used herein, the term "substantially" means largely but not necessarily wholly.

To further optimize the selected surfactant or surfactant blend type and concentration, the NAC model may be employed to determine the maximum solubility with the least amount of surfactant or surfactant blend required (e.g., to minimize costs) and price, which depends on concentration and the projected price of the surfactant or surfactant blend over the life of the formation. The NAC model provides the link between solubility and concentration that may be used to further optimize the selected surfactant or surfactant blend for use in a surfactant flooding EOR operation as described herein, thereby determining an optimal concentrated Surfactant or surfactant blend. The NAC model may be employed using Equation 8 below:

$$V_m = V_o - \frac{A_s * R_w}{3}, \quad \text{Equation 8}$$

where $V_m$ is the volume of emulsion produced, $A_s$ is the surfactant or surfactant blend interfacial area and is $A_s$ is calculated according to Equation 9 below, and $R_w$ is the radius of the aggregates of water in the aqueous phase of the surfactant or surfactant blend and is calculated according to Equation 10 below:

$$A_s = \Sigma_i C_{si} * V_o * 6.023 * 10^{23} * a_{si} \quad \text{Equation 9,}$$

where $C_{si}$ is the surfactant concentration of the fraction of the $i^{th}$ surfactant component, $V_o$ is the volume of oil phase of the produced hydrocarbon fluid, and $\alpha_{si}$ is the surface area per molecule of the surfactant of the $i^{th}$ surfactant component (dependent on the type of surfactant). $R_w$ is calculated from Equation 10 below:

$$\left|\frac{1}{R_o}\right| - \left|\frac{1}{R_w}\right| = -\frac{HDL}{L}, \quad \text{Equation 10}$$

where L is the length scaling parameter proportional to the extended length of the surfactant tail (lipophilic) group of the surfactant, and $R_o$ is the radius of the aggregates of oil in the oil phase of the surfactant or surfactant blend and is calculated according to Equation 11 below:

$$R_o = \frac{3 * V_o}{A_s}. \quad \text{Equation 11}$$

After identification of the optimal surfactant or surfactant blend, or the optimal concentrated surfactant or surfactant blend (collectively referred to below simple as "optimal surfactant") for use a surfactant flooding EOR operation, the optimal may be introduced into a wellbore in a subterranean formation to improve oil recover. In various embodiments, systems configured for delivering the optimal surfactants described herein to a downhole location are described. In various embodiments, the systems can comprise a pump fluidly coupled to a tubular, the tubular containing the optimal surfactants described herein.

The pump may be a high pressure pump in some embodiments. As used herein, the term "high pressure pump" will refer to a pump that is capable of delivering the optimal surfactant downhole at a pressure of about 1000 psi or greater. A high pressure pump may be used when it is desired to introduce the optimal surfactants to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the optimal surfactants to the high pressure pump. In such embodiments, the low pressure pump may "step up" the pressure of the optimal surfactants before reaching the high pressure pump.

In some embodiments, the systems described herein can further comprise a mixing tank that is upstream of the pump and in which the optimal surfactants are formulated. In various embodiments, the pump (e.g., a low pressure pump, a high pressure pump, or a combination thereof) may convey the optimal surfactants from the mixing tank or other source of the optimal surfactants to the tubular. In other embodiments, however, the optimal surfactants may be formulated offsite and transported to a worksite, in which case the optimal surfactant may be introduced to the tubular via the pump directly from its shipping container (e.g., a truck, a railcar, a barge, or the like) or from a transport pipeline. In either case, the optimal surfactants may be drawn into the pump, elevated to an appropriate pressure, and then introduced into the tubular for delivery downhole.

Figure 2:
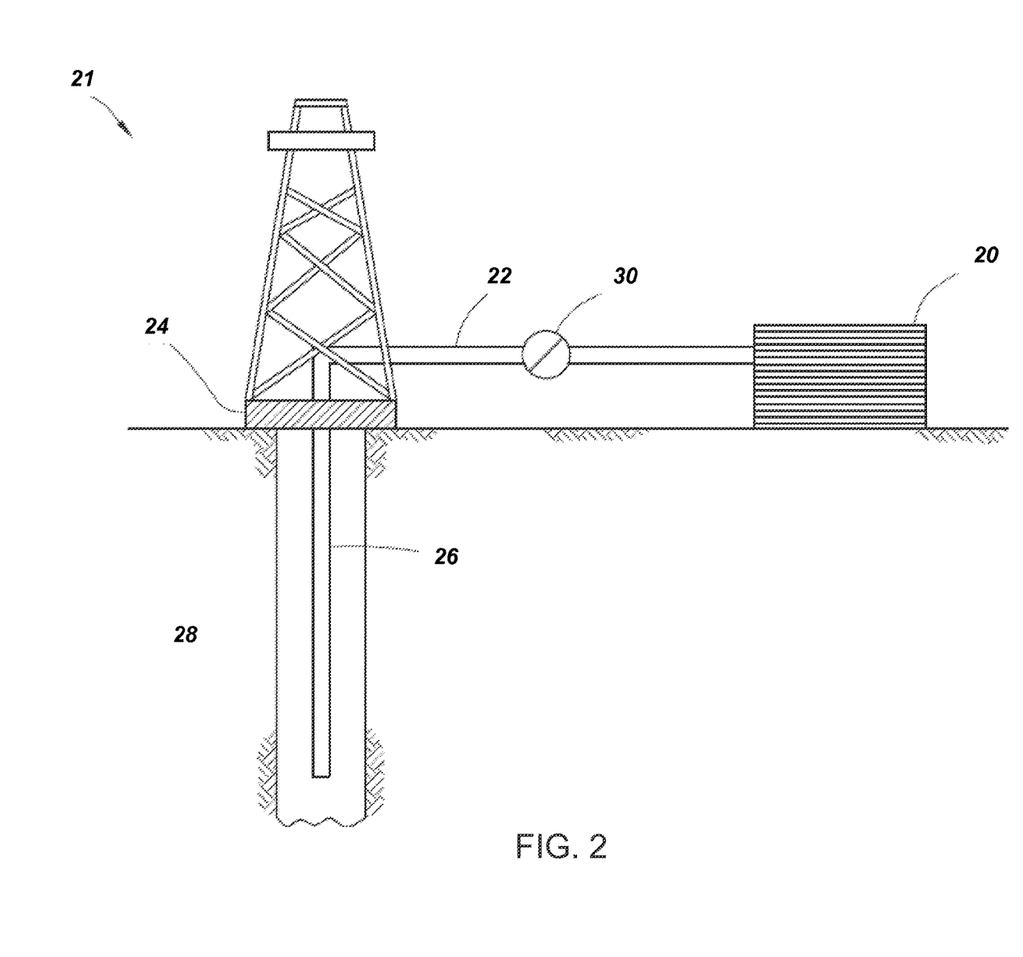
FIG. 2 provides an illustration of a production system suitable for use in conjunction with the methods described herein.

FIG. 2 shows an illustrative schematic of a system that can deliver the optimal surfactants of the present disclosure to a downhole location, according to one or more embodiments. It should be noted that while FIG. 2 generally depicts a land-based system, it is to be recognized that like systems may be operated in subsea locations as well. As depicted in FIG. 2, system 21 may include mixing tank 20, in which the optimal surfactants of the embodiments herein may be formulated. The optimal surfactants may be conveyed via line 22 to wellhead 24, where the optimal surfactants enter tubular 26, tubular 26 extending from wellhead 24 into subterranean formation 28. Upon being ejected from tubular 26, the optimal surfactants may subsequently penetrate into subterranean formation 28. Pump 30 may be configured to raise the pressure of the optimal surfactants to a desired degree before introduction into tubular 26. It is to be recognized that system 21 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the optimal surfactant may, in some embodiments, flow back to wellhead 24 and exit subterranean formation 28. In some embodiments, the optimal surfactant that has flowed back to wellhead 24 may subsequently be recovered and recirculated to subterranean formation 28.

It is also to be recognized that the disclosed optimal surfactants may also directly or indirectly affect the various downhole equipment and tools that may come into contact with the optimal surfactants during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

It should also be noted that the various drawings provided herein are not necessarily drawn to scale nor are they, strictly speaking, depicted as optically correct as understood by those skilled in optics. Instead, the drawings are merely illustrative in nature and used generally herein in order to supplement understanding of the systems and methods provided herein. Indeed, while the drawings may not be optically accurate, the conceptual interpretations depicted therein accurately reflect the exemplary nature of the various embodiments disclosed.

Embodiments herein include:

Embodiment A

A method comprising: obtaining a sampled fluid from a subterranean formation, the sampled fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$); determining constituent parameters of the sampled fluid using the hydrophilic-lipophilic deviation (HLD) model according to Equation A for an ionic surfactant composition and Equation B for a nonionic surfactant composition:

$$HLD=\ln(S)-k^*EACN+c_c-\alpha_T(T-25°\ C.) \qquad \text{Equation A}$$

$$HLD=b(S)-k^*EACN+c_{cn}-c_T(T-25°\ C.) \qquad \text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition; determining an optimal surfactant or surfactant blend to achieve an oil-water separation morphological phase of the sampled fluid; and introducing the optimal surfactant or surfactant blend into the subterranean formation as part of a surfactant flooding enhanced oil recovery operation.

Embodiment A may have one or more of the following additional elements in any combination:

Element A1: Wherein the step of determining at least one of the constituent parameters using Equation A or Equation B comprises employing a method selected from the group consisting of a surfactant-surfactant method, a surfactant-oil method, a salinity method, and any combination thereof.

Element A2: Further comprising obtaining the sampled fluid from a bulk hydrocarbon fluid.

Element A3: Wherein the surfactant flooding enhanced oil recovery operation is performed during a primary recovery stage.

Element A4: Wherein the surfactant flooding enhanced oil recovery operation is performed during a secondary recovery stage.

Element A5: Wherein the surfactant flooding enhanced oil recovery operation is performed during a tertiary recovery stage.

Element A6: Wherein the optimal surfactant or surfactant blend comprises the nonionic surfactant composition.

Element A7: Wherein the optimal surfactant or surfactant blend comprises the ionic surfactant composition.

Element A8: Wherein the sampled fluid comprises a greater amount of the water than the hydrocarbon, or a greater amount of the hydrocarbon than the water.

Element A9: Further comprising a wellhead with a tubular extending therefrom and into a subterranean formation; and a pump fluidly coupled to the tubular, the tubular comprising the optimal surfactant or optimal surfactant blend.

By way of non-limiting example, exemplary combinations applicable to A include: A with A1 and A2; A with A1 and A3; A with A1 and A4; A with A1 and A5; A with A1 and A6; A with A1 and A7; A with A1 and A8; A with A1 and A9; A with A2 and A3; A with A2 and A4; A with A2 and A5; A with A2 and A6; A with A2 and A7; A with A2 and A8; A with A2 and A9; A with A3 and A4; A with A3 and A5; A with A3 and A6; A with A3 and A7; A with A3 and A8; A with A3 and A9; A with A4 and A5; A with A4 and A6; A with A4 and A7; A with A4 and A8; A with A4 and A9; A with A5 and A6; A with A5 and A7; A with A5 and A8; A with A5 and A9; A with A6 and A7; A with A6 and A8; A with A6 and A9; A with A7 and A8; A with A7 and A9; A with A8 and A9; A with A1, A2, A3, A4, A5, A6, A7, A8, and A9; A with A1, A2, A3, A5, A7, and A9; A with A1, A4, and A6; A with A3, A4, and A8; and the like.

Embodiment B

A method comprising: obtaining a sampled fluid from a subterranean formation, the sampled fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$); determining constituent parameters of the sampled fluid using the hydrophilic-lipophilic deviation (HLD) model according to Equation A for an ionic surfactant composition and Equation B for a nonionic surfactant composition:

$$HLD=\ln(S)-k^*EACN+c_c-\alpha_T(T-25°\ C.) \qquad \text{Equation A}$$

$$HLD=b(S)-k^*EACN+c_{cn}-c_T(T-25°\ C.) \qquad \text{Equation B,}$$

where S is salinity of sampled fluid; h is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition; determining an optimal surfactant or surfactant blend to achieve an oil-water separation morphological phase of the sampled fluid; determining an optimal concentration of the determined optimal surfactant or surfactant blend using the Net-Average Curvature (NAC) model, according to Equation C:

$$V_m = V_o - \frac{A_s * R_w}{3}, \qquad \text{Equation C}$$

where $V_m$ is a volume of an emulsion in the oil-water separation morphological phase of the sampled fluid; $A_s$ is an interfacial area of the optimal surfactant or surfactant blend; and $R_w$ is a radius of water aggregates in the optimal surfactant or surfactant blend, thereby determining an optimal concentrated surfactant or surfactant blend.

Embodiment B may have one or more of the following additional elements in any combination:

Element B1: Wherein the step of determining at least one of the constituent parameters using Equation A or Equation B comprises employing a method selected from the group consisting of a surfactant-surfactant method, a surfactant-oil method, a salinity method, and any combination thereof.

Element B2: Further comprising obtaining the sampled fluid from a bulk hydrocarbon fluid.

Element B3: Wherein the surfactant flooding enhanced oil recovery operation is performed during a primary recovery stage.

Element B4: Wherein the surfactant flooding enhanced oil recovery operation is performed during a secondary recovery stage.

Element B5: Wherein the surfactant flooding enhanced oil recovery operation is performed during a tertiary recovery stage.

Element B6: Wherein the optimal concentrated surfactant or surfactant blend comprises the nonionic surfactant composition.

Element B7: Wherein the optimal concentrated surfactant or surfactant blend comprises the ionic surfactant composition.

Element B8: Wherein the sampled fluid comprises a greater amount of the water than the hydrocarbon, or a greater amount of the hydrocarbon than the water.

Element B9: further comprising a wellhead with a tubular extending therefrom and into a subterranean formation; and a pump fluidly coupled to the tubular, the tubular comprising the optimal concentrated surfactant or surfactant blend.

By way of non-limiting example, exemplary combinations applicable to B include: B with B1 and B2; B with B1 and B3; B with B1 and B4; B with B1 and B5; B with B1 and B6; B with B1 and B7; B with B1 and B8; B with B1 and B9; B with B2 and B3; B with B2 and B4; B with B2 and B5; B with B2 and B6; B with B2 and B7; B with B2 and B8; B with B2 and B9; B with B3 and B4; B with B3 and B5; B with B3 and B6; B with B3 and B7; B with B3 and B8; B with B3 and B9; B with B4 and B5; B with B4 and B6; B with B4 and B7; B with B4 and B8; B with B4 and B9; B with B5 and B6; B with B5 and B7; B with B5 and B8; B with B5 and B9; B with B6 and B7; B with B6 and B8; B with B6 and B9; B with B7 and B8; B with B7 and B9; B with B8 and B9; B with B1, B2, B3, B4, B5, B6, B7, B8, and B9; B with B1, B4, B5, B7, B8, and B9; B with B1, B8, and B9; B with B2, B4, and B5; and the like.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
obtaining a sampled fluid from a subterranean formation, the sampled fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$);
determining constituent parameters of the sampled fluid using a hydrophilic-lipophilic deviation (HLD) model according to Equation A for an ionic surfactant composition and Equation B for a nonionic surfactant composition:

$$HLD = \ln(S) - k*EACN + c_c - \alpha_T(T - 25°\ C.) \quad \text{Equation A}$$

$$HLD = b(S) - k*EACN + c_{cn} - c_T(T - 25°\ C.) \quad \text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition;
determining an optimal surfactant or surfactant blend based on the constituent parameters determined from the HLD model to achieve an oil-water separation morphological phase of the sampled fluid; and
introducing the optimal surfactant or surfactant blend into the subterranean formation as part of a surfactant flooding enhanced oil recovery operation.

2. The method of claim 1, wherein the step of determining at least one of the constituent parameters using Equation A or Equation B comprises employing a method selected from the group consisting of a surfactant-surfactant method, a surfactant-oil method, a salinity method, and any combination thereof.

3. The method of claim 1, further comprising obtaining the sampled fluid from a bulk hydrocarbon fluid.

4. The method of claim 1, wherein the surfactant flooding enhanced oil recovery operation is performed during a primary recovery stage.

5. The method of claim 1, wherein the surfactant flooding enhanced oil recovery operation is performed during a secondary recovery stage.

6. The method of claim 1, wherein the surfactant flooding enhanced oil recovery operation is performed during a tertiary recovery stage.

7. The method of claim 1, wherein the optimal surfactant or surfactant blend comprises the nonionic surfactant composition.

8. The method of claim 1, wherein the optimal surfactant or surfactant blend comprises the ionic surfactant composition.

9. The method of claim 1, wherein the sampled fluid comprises a greater amount of the water than the hydrocarbon, or a greater amount of the hydrocarbon than the water.

10. The method of claim 1, further comprising a wellhead with a tubular extending therefrom and into the subterranean formation; and
a pump fluidly coupled to the tubular, the tubular comprising the optimal surfactant or optimal surfactant blend.

11. A method comprising:
obtaining a sampled fluid from a subterranean formation, the sampled fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$);
determining constituent parameters of the sampled fluid using a hydrophilic-lipophilic deviation (HLD) model according to Equation A for an ionic surfactant composition and Equation B for a nonionic surfactant composition:

$$\text{HLD} = \ln(S) - k*\text{EACN} + c_c - \alpha_T(T - 25° \text{ C.}) \quad \text{Equation A}$$

$$\text{HLD} = b(S) - k*\text{EACN} + c_{cn} - c_T(T - 25° \text{ C.}) \quad \text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $C_T$ is a surfactant temperature constant for the nonionic surfactant composition;
determining an optimal surfactant or surfactant blend based on the constituent parameters determined from the HLD model to achieve an oil-water separation morphological phase of the sampled fluid;
determining an optimal concentration of the determined optimal surfactant or surfactant blend using a Net-Average Curvature (NAC) model, according to Equation C:

$$V_m = V_o - \frac{A_s * R_w}{3}, \quad \text{Equation C}$$

where $V_m$ is a volume of an emulsion in the oil-water separation morphological phase of the sampled fluid; $A_s$ is an interfacial area of the optimal surfactant or surfactant blend; and $R_w$ is a radius of water aggregates in the optimal surfactant or surfactant blend, thereby determining an optimal concentrated surfactant or surfactant blend;
introducing the optimal surfactant or surfactant blend into the subterranean formation at the optimal concentration determined from the NAC model as part of a surfactant flooding enhanced oil recovery operation.

12. The method of claim 11, wherein the step of determining at least one of the constituent parameters using Equation A or Equation B comprises employing a method selected from the group consisting of a surfactant-surfactant method, a surfactant-oil method, a salinity method, and any combination thereof.

13. The method of claim 11, further comprising obtaining the sampled fluid from a bulk hydrocarbon fluid.

14. The method of claim 11, wherein the surfactant flooding enhanced oil recovery operation is performed during a primary recovery stage.

15. The method of claim 11, wherein the surfactant flooding enhanced oil recovery operation is performed during a secondary recovery stage.

16. The method of claim 11, wherein the surfactant flooding enhanced oil recovery operation is performed during a tertiary recovery stage.

17. The method of claim 11, wherein the optimal concentrated surfactant or surfactant blend comprises the nonionic surfactant composition.

18. The method of claim 11, wherein the optimal concentrated surfactant or surfactant blend comprises the ionic surfactant composition.

19. The method of claim 11, wherein the sampled fluid comprises a greater amount of the water than the hydrocarbon, or a greater amount of the hydrocarbon than the water.

20. The method of claim 11, further comprising a wellhead with a tubular extending therefrom and into the subterranean formation; and
a pump fluidly coupled to the tubular, the tubular comprising the optimal concentrated surfactant or surfactant blend.

* * * * *